United States Patent
Mor et al.

(10) Patent No.: US 12,531,439 B2
(45) Date of Patent: Jan. 20, 2026

(54) WIRELESS CHARGEABLE GAMING CONTROLLER

(71) Applicant: Wi-Charge Ltd., Rehovot (IL)

(72) Inventors: Ori Rafael Mor, Tel Aviv (IL); Zohar Levin, Rehovot (IL); Alexander Slepoy, Chandler, AZ (US); Eli Zlatkin, Tel Aviv (IL); Nir Simon, Kibbutz Ein Hashofet (IL)

(73) Assignee: WI-CHARGE LTD., Rehovot (IL)

( * ) Notice: Subject to any disclaimer, the term of this patent is extended or adjusted under 35 U.S.C. 154(b) by 285 days.

(21) Appl. No.: 18/109,949

(22) Filed: Feb. 15, 2023

(65) Prior Publication Data
US 2023/0261526 A1    Aug. 17, 2023

Related U.S. Application Data

(60) Provisional application No. 63/310,238, filed on Feb. 15, 2022.

(51) Int. Cl.
| | | |
|---|---|---|
| *H02J 50/30* | (2016.01) | |
| *A63F 13/24* | (2014.01) | |
| *A63F 13/98* | (2014.01) | |
| *H02J 7/35* | (2006.01) | |
| *H02J 50/80* | (2016.01) | |
| *H02J 50/90* | (2016.01) | |

(52) U.S. Cl.
CPC .............. *H02J 50/30* (2016.02); *A63F 13/24* (2014.09); *A63F 13/98* (2014.09); *H02J 7/35* (2013.01); *H02J 50/80* (2016.02); *H02J 50/90* (2016.02)

(58) Field of Classification Search
CPC .... H02J 50/30; H02J 7/35; H02J 50/80; H02J 50/90; A63F 13/24; A63F 13/98; A63F 13/235; Y02E 10/56
USPC .......................................................... 463/37
See application file for complete search history.

(56) References Cited

U.S. PATENT DOCUMENTS

| | | | |
|---|---|---|---|
| 2011/0163713 A1* | 7/2011 | Wang ...................... | H02J 50/80 320/108 |
| 2022/0085660 A1* | 3/2022 | Glover .................... | H02J 50/20 |

* cited by examiner

*Primary Examiner* — Pierre E Elisca
(74) *Attorney, Agent, or Firm* — AlphaPatent Associates Ltd.; Daniel J. Swirsky

(57) ABSTRACT

New systems for the wireless recharging of the batteries of game controllers, without the need for placing the game controller on a dedicated charging device such as an inductively coupled charging pad or its charging docking station. Wireless charging can continue even when the gaming controllers are being moved, when in use during the gaming session, and certainly when the controller is left by the user in some random location in the area in which the system is installed. A transmitter beams optical power, such as a laser beam, to an optical power receiver located on the controller itself, which, using a photovoltaic cell and an appropriate voltage converter, converts the optical beam power to a current for charging the battery. A beam aiming mechanism, such as a scanning mirror, is provided to ensure correct tracking of the game controller, according to the outputs of a beam tracking application.

8 Claims, 2 Drawing Sheets

WIRELESS CHARGEABLE GAMING CONTROLLER

FIELD

The present disclosure describes technology related to the field of game controllers, especially for systems and methods of providing wireless charging thereto.

BACKGROUND

Gaming controllers have achieved great popularity amongst players of computer games, since for fast moving games, many users find them more appropriate than the use of the computer keyboard and mouse. Such gaming controllers have been long available in wireless connected versions, without the need for wire connections to the computer. In such systems, communication with the computer system can be done either by infrared optical channels or by wireless communication. Gaming controllers are powered by internal batteries, and rechargeable batteries are the preferred power source. Wireless recharging is available for many gaming controllers, using inductively coupled charging mats or customized inductive charging docking stations, in order to implement the recharging process. In order to accomplish the recharging process, the gaming controller has to be placed on or in close proximity to the charging mat, or to be positioned on the inductive charging docking station, since inductive charging has only a short range of influence.

This form of wireless charging has a disadvantage in that it requires a positive action by the user at the end of his/her playing session, to place the gaming controller on the charging pad or in the charging docking station. This action can readily be forgotten, especially by children, who, after the exhilaration of playing a gaming session, would simply leave the gaming controller lying around the living room, on a sofa or on a table at which they have been playing, rather than on the power coupling mat. Consequently, the next time they pick up the game controller for use, it may be found to have completely depleted batteries.

There therefore exists a need for a cordless rechargeable game controller which will overcome the disadvantages of presently available rechargeable game controllers.

The disclosures of each of the publications mentioned in this section and in other sections of the specification, are hereby incorporated by reference, each in its entirety.

SUMMARY

The present disclosure attempts to provide novel systems and methods that overcome at least some of the disadvantages of prior art systems and methods. The present disclosure describes new exemplary systems for the wireless recharging of the batteries of game controllers, which is operative whether or not the user actively actuates the charging process, and without the need for placing the game controller on a dedicated charging device such as an inductively coupled charging pad or its charging docking station. Most advantageously, the wireless charging system of the present disclosure operates automatically and charging takes place even when the gaming controllers are being moved when in use during the gaming session, and certainly when, following a gaming session, the controller is left by the user in some random location in the room in which the system is installed.

In the presently disclosed system, the recharging process is achieved by the beaming of optical power from a transmitter located in a suitable position in the area where the gaming session is to be held, such as in the ceiling of the room, or on top of the television screen being used to follow the game, to an optical power receiver located on the controller itself. The optical power transmitter should have a beam aiming mechanism, such as a scanning mirror, and the system should include a tracking application to enable the beam to follow the movements of the game controller, even during the excited motions which a child holding a game controller may perform, such that charging can be continually carried out even when the game controller is in use during a gaming session. The optical power receiver generally comprises a photovoltaic sensor, which converts the optical power into a DC current, followed by a DC/DC voltage converter for providing the correct voltage required for recharging the batteries. This combination of the photovoltaic cell and the immediately following DC/DC voltage converter, to convert the photocell output voltage to a more useable level, may be termed the charging unit, since its output fulfills the primary object of the power receiving combination, namely, the charging of the battery. In situations where the gaming controller circuitry operates on a different voltage to that required to charge the battery, then a second voltage converter may be needed in order to provide current for the controller circuits at the required voltage. Alternatively, if the voltage output from the charging unit is suitable for powering the circuits of the controller, then the second voltage converter would need to provide current at the correct voltage for charging the battery. Since the current flow in relation to the battery either flows into the battery or out of the battery, in order to ensure continued operation of the controller while the charging unit is supplying current to the battery, and hence the controller cannot draw any current from the battery, a separate source of current must be provided to the gaming controller. This can be supplied by means of a link providing current from the charging unit to the controller, without involving the battery. Such a link may need its own DC/DC voltage converter, as explained above. Such an arrangement, in which the current from the charging unit can be supplied both to charge the battery and to power the controller, and at the same time, the controller may draw its current both from the charging unit and the battery, essentially constitutes a virtual junction connecting all three elements—the game controller, the charging unit and the battery, with the logical exceptions for allowed current flow, as explained hereinabove.

The components and circuitry required on the gaming controller for enabling reception of the beamed optical power and its conversion into a charging current, can either be built into the originally supplied game controller, or alternatively, can be incorporated into a plug-in wireless charging unit, which can be installed retroactively on suitable game controllers, thus enabling simpler game controllers to take advantage of the recharging features described in the present disclosure. The optical power beam is most advantageously provided by a laser beam, generated by a laser emitter mounted in the transmitter.

There is thus provided in accordance with an exemplary implementation of the devices described in this disclosure, a wireless charging gaming controller system comprising:

(i) a photovoltaic cell adapted to receive a beam of optical power from a transmitting unit, and to convert the optical power into an output current in a charger unit;

(ii) at least one gaming controller circuits operated by using input current derived from the charger unit at a first voltage; and (iii) a rechargeable battery, connected to receive charging current derived from the charger unit at a second voltage, and to provide current to the gaming controller circuits;

wherein the charge unit is also connected through a virtual junction to the gaming controller circuits, such that the circuits can continue to operate at said first voltage while the battery is drawing current from the charging unit at said second voltage to replenish its charge.

In such a wireless charging gaming controller system, the virtual junction may further include a voltage converter converting either said first voltage to said second voltage or said second voltage to said first voltage.

Alternatively, in the wireless charging gaming controller system described above, the charger unit may either output a current at the first voltage and the charging current to the battery is provided by a voltage converter to output a current at the second voltage, or the charger unit may output a current at the second voltage and the input current to the gaming controller circuits is provided by a voltage converter to output a current at the first voltage.

Furthermore, in another implementation of the above described wireless charging gaming controller system, the charger unit further comprises a DC/DC converter, adapted to convert the voltage of the charging current generated by the photovoltaic cell, to the second voltage for charging the rechargeable battery.

Additionally, in the wireless charging gaming controller systems described above, the charger unit further may comprise a DC/DC converter, adapted to convert the voltage of the charging current generated by the photovoltaic cell, to the first voltage for charging the rechargeable battery.

In any of the above described wireless charging gaming controller systems, the photovoltaic cell should be aligned on the gaming controller, such that it is directed in the general direction of the transmitting unit.

Additionally, any of the above described wireless charging gaming controller systems may further comprise a sensing unit for communicating to the transmitting unit information regarding the impingement of the beam of optical power on the photovoltaic cell input aperture. In such a case, the information may be used in order to align the beam of optical power to impinge on the photovoltaic cell input aperture.

Finally, in any of those wireless charging gaming controller systems, the rechargeable battery, the photovoltaic cell and the charging unit may comprise a detachable module adapted to convert a game controller for remote wireless charging.

BRIEF DESCRIPTION OF THE DRAWINGS

The present invention will be understood and appreciated more fully from the following detailed description, taken in conjunction with the drawings in which.

DETAILED DESCRIPTION

Figure 1:
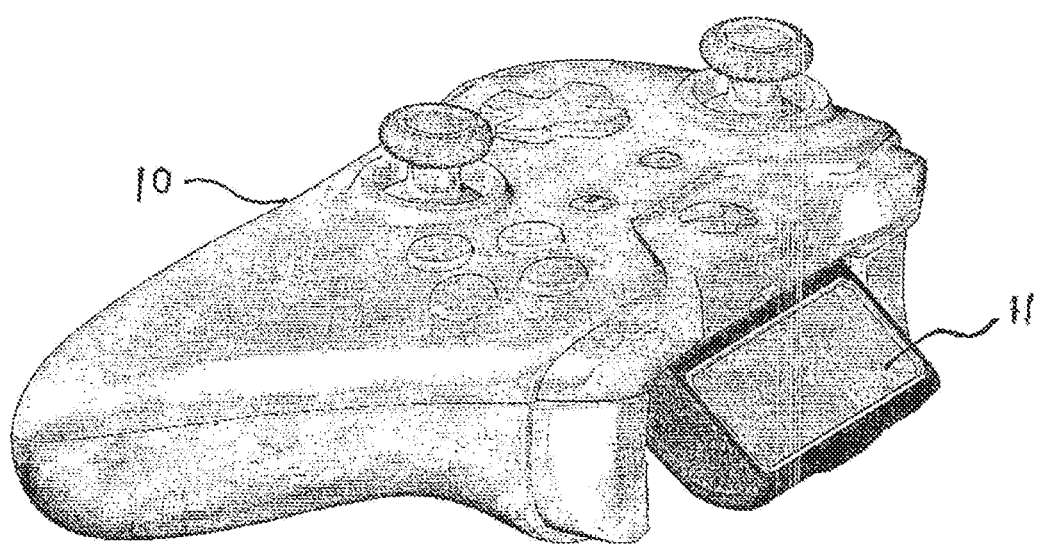
FIG. 1 illustrates schematically an exemplary gaming controller, constructed according to the present disclosure, and having an optical beam receiver.

Reference is now made to FIG. 1, which illustrates schematically an exemplary gaming controller 10 constructed according to the present disclosure. It differs from a conventional gaming controller in that it comprises a photovoltaic cell 11 mounted thereupon, and adapted to receive an impinging beam of optical power from a laser transmitter, for conversion into charging power for the onboard rechargeable batteries. The position and angle of orientation of the photovoltaic cell input aperture should be arranged such that it is aimed at the laser beam transmitter for as much as possible of the time. This means that the position and angle of the photovoltaic cell should be such that the power beam impinges thereupon in as close as possible to a normal direction. Consequently, the entrance aperture of the photovoltaic sensor should therefore be facing upwards from the top of the controller, so that if the transmitter is on the ceiling of the room, or in a top corner of the room, the photocell absorber aperture will absorb the beam efficiently. However, the presence of the buttons on the top of the controller prevent the photocell input aperture from being situated on the top surface of the controller. The absorber aperture should also have a forward facing component, such that if the transmitter is on the top of the television screen, the aperture of the photovoltaic cell again receives the beam at a reasonable angle for efficient transfer of energy from the beam. From the way in which the game controller is ergonomically held in the hands of the players, i.e. in an approximately horizontal position, or slightly pointing downward from a horizontal position, it is clear that the absorbing aperture of the photovoltaic cell should be tilted at approximately 45° or slightly less to the horizontal, such that even when tilted slightly forward it is still at a good angle at which the beam may impinge on the absorber surface at close to a normal incidence, which is the angle providing optimum optical power transfer.

Figure 2:
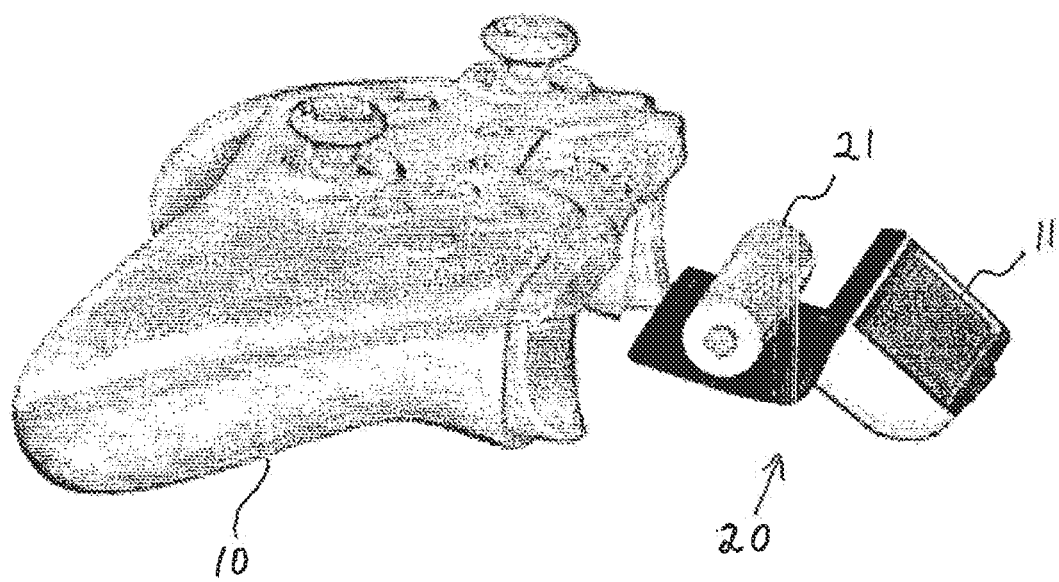
FIG. 2 shows how the photovoltaic absorbing cell may be conveniently provided in a single, plug-in unit also containing the battery and its recharging circuits.

Reference is now made to FIG. 2, which shows how the photovoltaic absorbing cell 11 may be conveniently provided in a single, plug-in unit 20 which also comprises the DC/DC voltage conversion circuitry (not shown in the drawing), and the rechargeable battery 21. Such a single unit may be constructed such that it can be plugged into the game controller in place of the originally provided rechargeable battery and any connection thereto. Such a construction enables the wireless recharging facility to be added as an aftermarket feature to a conventional game controller.

Figure 3:
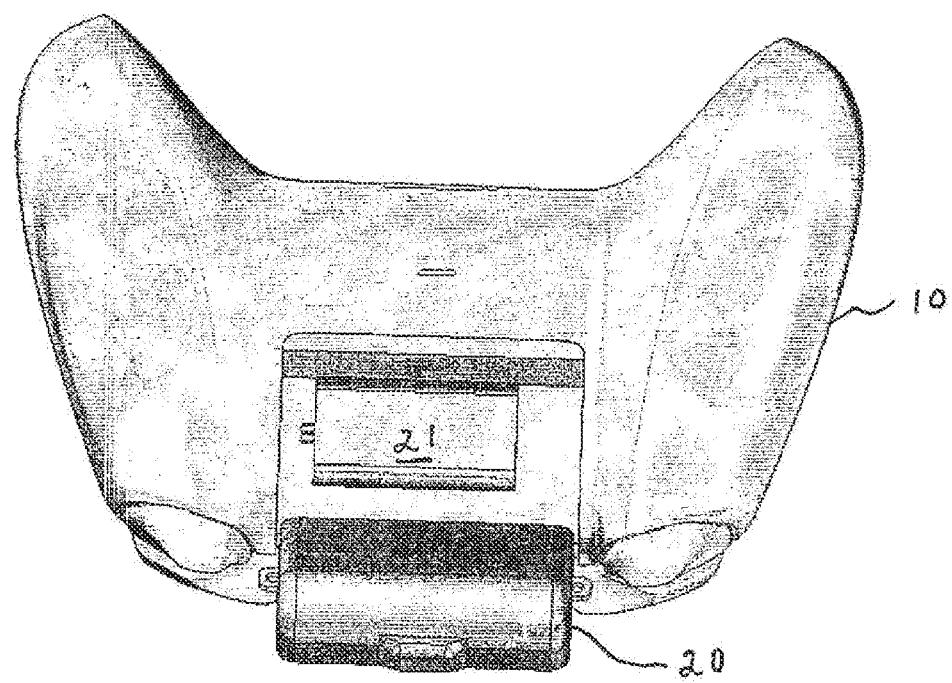
FIG. 3 shows the bottom side of the game controller, illustrating how the plug-in absorber/converter unit is mounted into the controller.

Reference is now made to FIG. 3 which shows the bottom side of the game controller, illustrating how the plug-in absorber/converter unit 20 is mounted into the controller 10. The plug-in absorber/converter unit 20 should also contain control circuitry, for remote communication with the scanning mirror of the beam transmitter, the control circuitry operating in conjunction with the control of the scanning mirror in order to ensure that the power beam remains aimed at the controller, regardless of movement of the controller. Such circuitry and feedback mechanisms are described in a number of patent applications owned by the present applicants, including U.S. Pat. No. 9,312,701 for "A System for Optical Wireless Power Supply", and in co-pending IL patent application No. 286842 for "A System for Location and Charging of Wireless Power Receivers".

Figure 4:
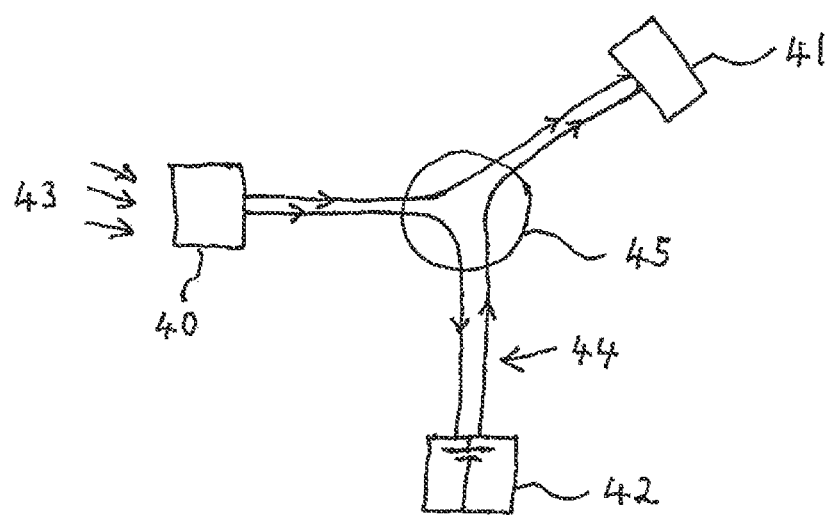
FIG. 4 shows an electrical network connecting the charging unit to the battery and to the circuitry of the remote chargeable gaming controller of the previous figures.

Reference is now made to FIG. 4 which shows one aspect of the charging circuitry of the remote chargeable gaming controller 41 of the present disclosure. The connection of the battery 42 to the charging circuitry of the game controller 41 presents a problem in electrical network planning. The battery 42 itself can be in a situation of either receiving current from the charger circuitry 40 when the optical power beam 43 impinges on the photovoltaic cell, or of transmitting current towards the circuits of the gaming controller 41. Considering a simplified system in which the current from the charging circuits and the current to the gaming controller circuitry and the current to or from the battery meet at an imaginary junction 45. Considering all of the possibilities of current flow within the network shown in FIG. 4, while the overall current generated by the charging circuitry 40 can go into the battery 42 for charging or towards the controller circuitry 41 for direct dissipation there, and while the current drawn by the controller circuitry 41 can come either from the battery 42 or from the charging circuitry 40, and while the current in the arm 44 of the battery 42, can either come from the charger 40 or go towards the controller circuitry 41, at any specific moment in time, the current in the battery arm is either charging the battery 42 or discharging charge from the battery 42. Current always flows from the charging circuits, and always flows into the game controller circuits, but the net current at any point of time, is either into the battery or out of the battery. Thus, for a situation where the battery is in a discharge mode, the net current flow into the game controller comes partly from the charging circuitry and partly from the battery discharge. This analysis is an outcome of the fact that a virtual current junction 45, cannot accumulate charge, since such a situation implies that there is a different level of current entering the junction from that leaving the junction. In other words, the sum of the currents going into the junction must equal sum of the currents going out of the junction.

Therefore, a situation in which the charger 40 is connected only to supply current to the battery 42, and the gaming controller circuitry 41 draws current only from the battery, is inoperable, since during the times when the battery i s being charged by the charging circuits, current is flowing only into the battery, and it is therefore impossible for the gaming controller to draw current from the battery. Thus the direct connection through the virtual junction 45 from the charger to the gaming controller circuitry is an essential feature of this system.

Since the battery generally requires a different voltage for its charging procedure, than the voltage needed by the controller circuits for operation, there may be a clash between the voltage output from the charging unit, and that needed by the battery or by the circuitry of the game controller. This problem is solved by providing an additional DC/DC converter to provide current at the correct voltage for the task whose voltage supply is not that provided by the charging unit. This additional voltage converter can either be built into the charging unit 40, which, as noted, does have two output paths, or it can be incorporate into the virtual junction 45.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Furthermore, it is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A wireless chargeable gaming controller system comprising:
   a charger comprising:
   a photovoltaic cell adapted to receive a beam of optical power from a transmitter, and to convert the optical power into an output current, and,
   a DC/DC converter, adapted to convert the voltage of the current generated by the photovoltaic cell, to a voltage for charging a rechargeable battery; and
   at least one gaming controller circuits operated by using input current derived from the charger unit at a first voltage,
   wherein the rechargeable battery, connected to receive charging current derived from the charger at a second voltage, is adapted to provide current to the gaming controller circuits; and
   wherein the charger is also connected through a virtual junction to the gaming controller circuits, such that the gaming controller circuits can continue to be operated at said first voltage while the battery is drawing current from the charger at said second voltage to replenish the charge of the battery.

2. The wireless chargeable gaming controller system according to claim 1, further including a voltage converter converting either said first voltage to said second voltage or said second voltage to said first voltage.

3. The wireless chargeable gaming controller system according to claim 1, wherein the charger either outputs a current at the first voltage and the charging current to the battery is provided by a voltage converter to output a current at the second voltage, or the charger outputs a current at the second voltage and the input current to the gaming controller circuits is provided by a voltage converter to output a current at the first voltage.

4. The wireless chargeable gaming controller system according to claim 1, wherein the photovoltaic cell is aligned on the gaming controller, such that the photovoltaic cell is directed in the general direction of the transmitting unit, when the gaming controller is held for use by the user.

5. The wireless chargeable gaming controller system according to claim 1, further comprising a sensor for communicating to the transmitter information regarding the impingement of the beam of optical power on the photovoltaic cell input aperture.

6. The wireless chargeable gaming controller system according to claim 5, wherein the information is used in order to align the beam of optical power to impinge on the photovoltaic cell input aperture.

7. The wireless chargeable gaming controller system according to claim 1, wherein the rechargeable battery, the photovoltaic cell and the charger comprise a detachable module adapted to convert a game controller for remote wireless charging.

8. A wireless charging gaming controller system having a charger, the system comprising:
   a photovoltaic cell adapted to receive an optical beam from a laser transmitter, and to convert the optical power into a charging current;
   gaming controller circuits powered by using an externally provided input current;
   a rechargeable battery, connected to receive charging current through a virtual junction from the charger and to provide current though the virtual junction to the gaming controller circuits; and at least one DC/DC voltage converter to supply the charging current to either the gaming controller circuits or to the rechargeable battery, wherein the charger is connected through the virtual junction to the gaming controller circuits, such that the gaming controller circuits can operate using the externally provided input current from the charger, while the battery is also connected through the virtual junction to the charger, drawing current to replenish the charge of the battery.

* * * * *